April 6, 1943.　　　H. V. GIBSON ET AL　　　2,315,515
DISPENSING APPARATUS
Filed Oct. 19, 1939　　　5 Sheets-Sheet 1

INVENTORS.
HERSCHEL V. GIBSON
ELMER E. CASEY
BY
ATTORNEYS.

April 6, 1943. H. V. GIBSON ET AL 2,315,515
DISPENSING APPARATUS
Filed Oct. 19, 1939  5 Sheets-Sheet 2
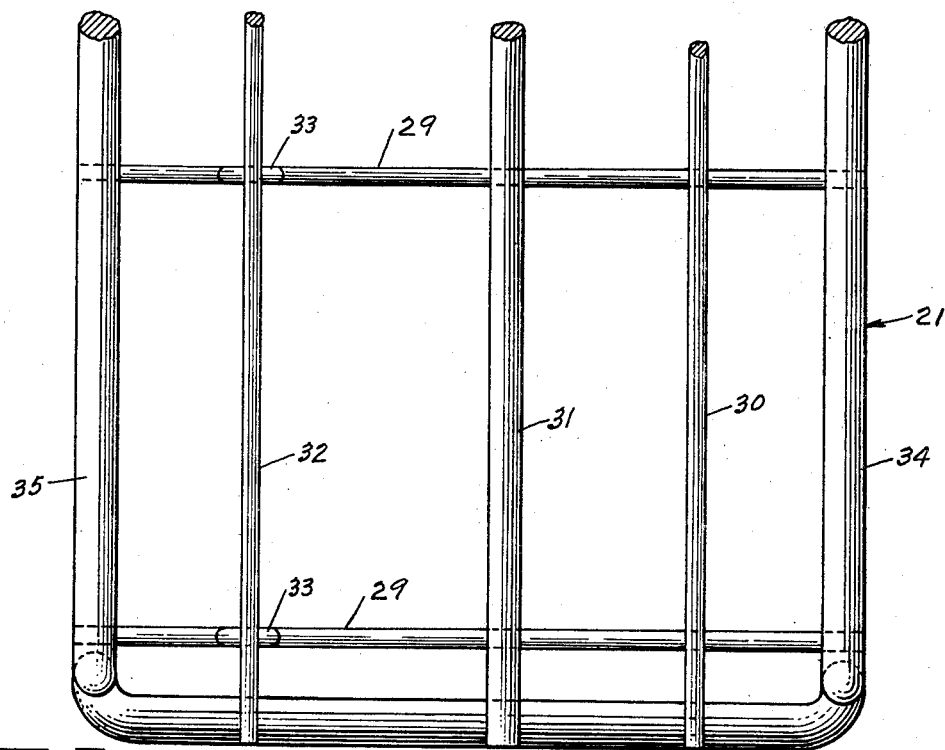
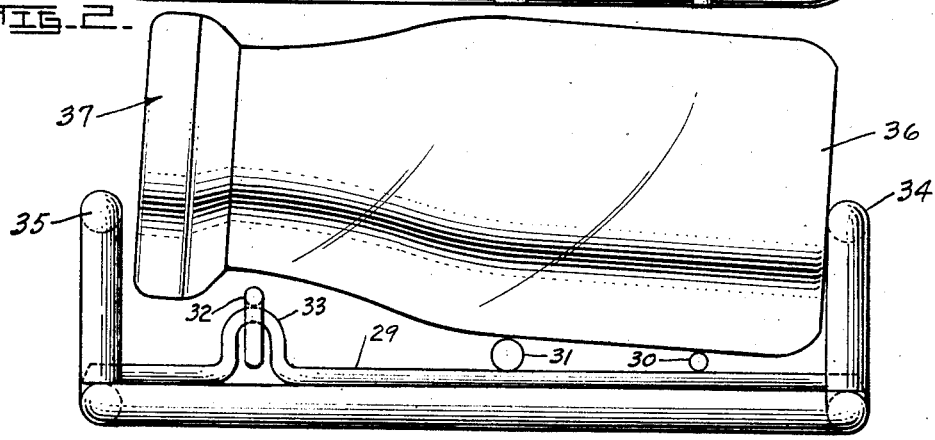
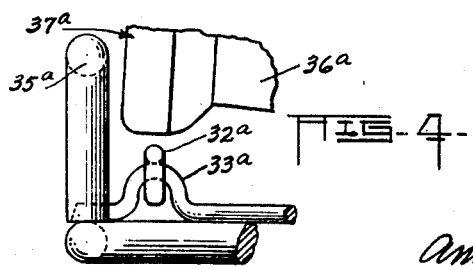
INVENTORS.
HERSCHEL V. GIBSON
ELMER E. CASEY
BY
ATTORNEYS.

April 6, 1943.   H. V. GIBSON ET AL   2,315,515
DISPENSING APPARATUS
Filed Oct. 19, 1939   5 Sheets-Sheet 3
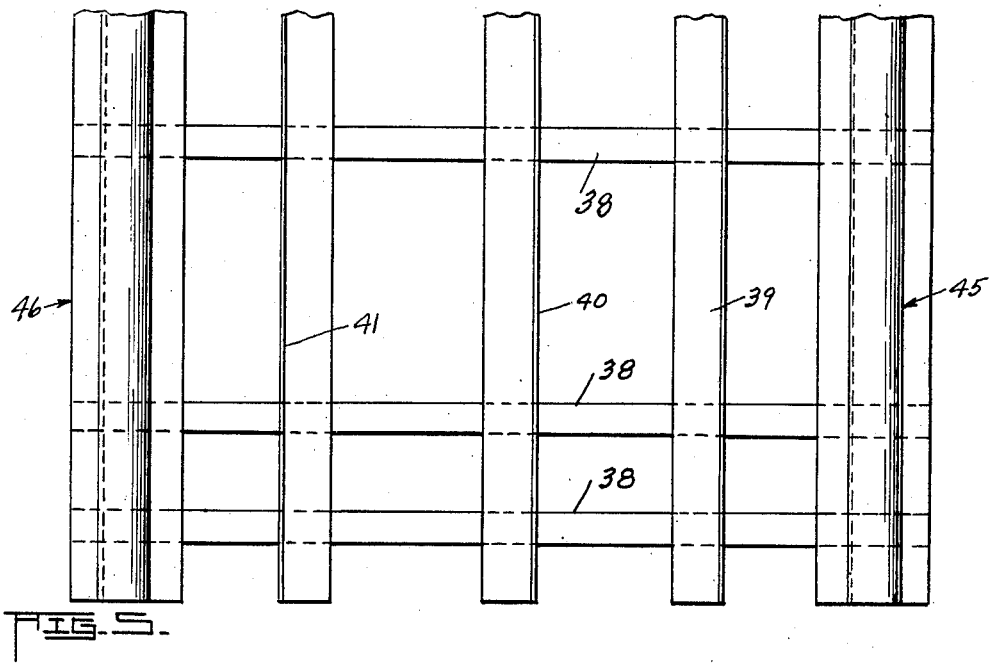
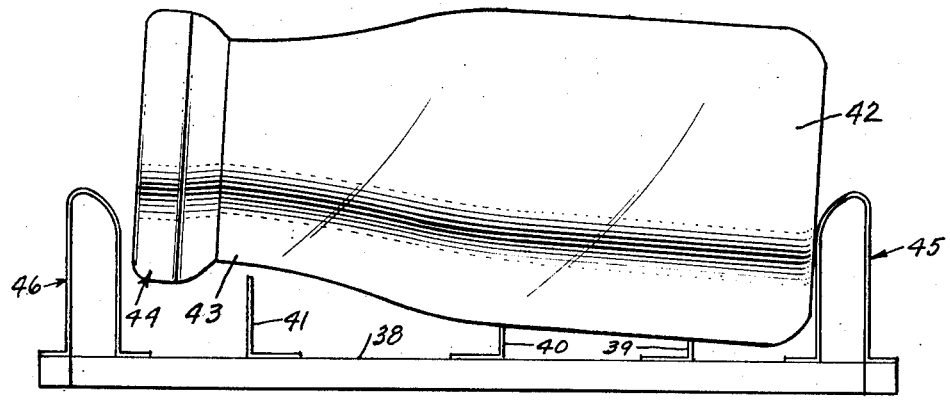
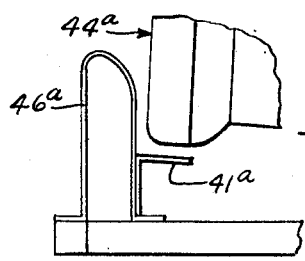
INVENTORS.
HERSCHEL V. GIBSON
ELMER E. CASEY
ATTORNEYS.

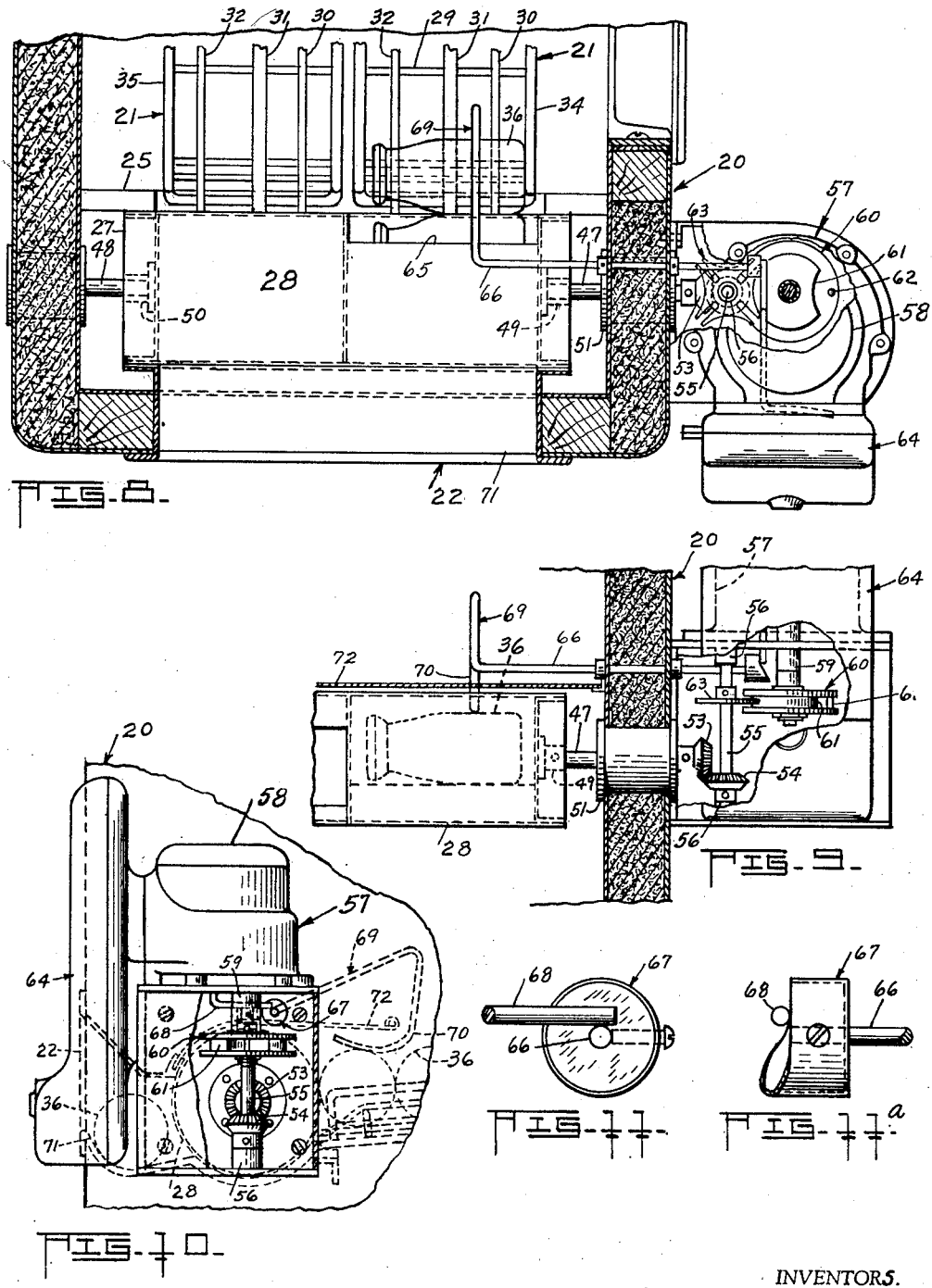

April 6, 1943.    H. V. GIBSON ET AL    2,315,515
DISPENSING APPARATUS
Filed Oct. 19, 1939    5 Sheets-Sheet 5
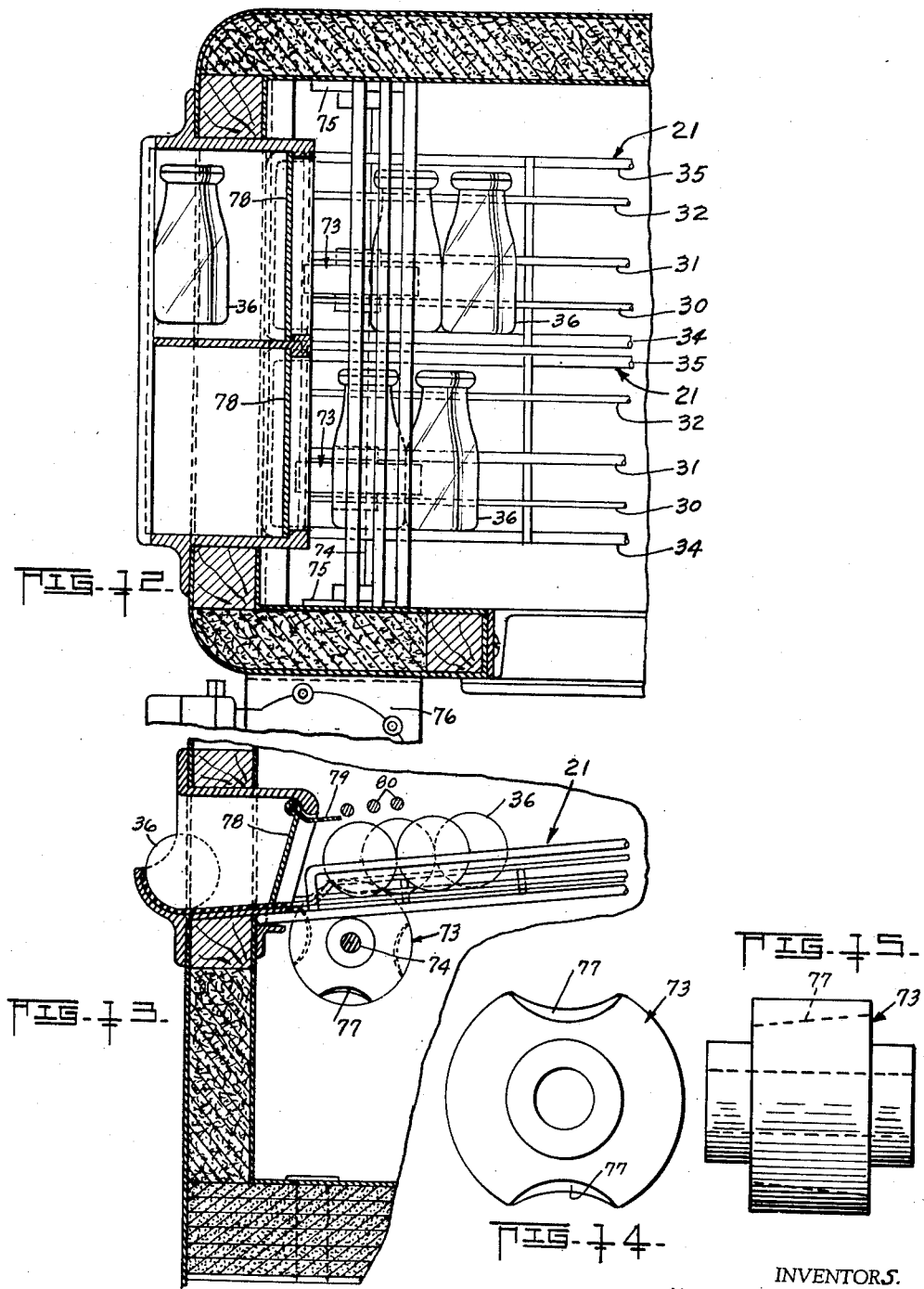
INVENTORS.
HERSCHEL V. GIBSON
ELMER E. CASEY
BY
Ames, Thiess, Olson & Mecklenburger
ATTORNEYS.

Patented Apr. 6, 1943

2,315,515

UNITED STATES PATENT OFFICE 2,315,515

DISPENSING APPARATUS

Herschel V. Gibson and Elmer E. Casey, Bloomington, Ill., assignors to Williams Oil-O-Matic Heating Corporation, Bloomington, Ill., a corporation of Illinois Application October 19, 1939, Serial No. 300,109

5 Claims. (Cl. 312—36)

This invention relates to a dispensing apparatus and has special reference to an apparatus of the character wherein it is desired to contain and dispense packaged liquid goods which are of a nature that requires a cool temperature to prevent spoiling.

More particularly, this invention relates to an apparatus for cooling and dispensing containers comprising a cabinet containing a storage chamber having a discharge opening and a plurality of inclined ramps disposed side by side for supporting and for advancing the containers by gravity to the discharge opening, each of the ramps comprising laterally extending supporting means and a plurality of longitudinally extending members carried by the supporting means for directing the containers to a dispensing means adjacent the discharge opening. The dispensing means has at least one longitudinally extending pocket for each of the ramps for receiving the containers and the pockets are staggered in a lateral direction in the path of the containers for dispensing the containers one at a time out of the discharge opening.

This invention also contemplates the provision of a gravity-weighted member normally supported in one position by the containers for controlling the normal operation of a coin-controlled means for operating the dispenser to deliver one of the containers at a time, the containers supporting the gravity-weighted member during the normal operation of the coin-controlled means and being automatically operable into a second position when the last container has been discharged through the discharge opening to render the coin-controlled means inoperative for discharging containers.

The inclined ramps for supporting and for advancing the containers by gravity to the discharge opening preferably comprise laterally and substantially horizontally extending supporting means and a plurality of longitudinally extending members carried by the supporting means in a laterally spaced relation, the spaced members being of non-uniform height and being adapted to engage a main body portion of substantially uniform cross section of the containers for the support thereof in a tilted position. In one form of the invention the pocketed portion of the dispensing means is disposed on the periphery of a cylinder and extends in the space between adjacent longitudinally extending members in the path of the containers for dispensing the containers out of the discharge opening.

One of the objects of this invention is to provide an apparatus of the above character which is comparatively inexpensive in construction, is simple and efficient in operation, and is durable.

It is also an object of this invention to provide an apparatus of the type indicated above in which the dispensing means is rendered inoperative to dispense containers when the last container has been discharged through the discharge opening.

A further object of this invention is to provide an apparatus of the type mentioned above wherein the containers are advanced to the discharge opening in a tilted position.

Other objects and advantages of this invention will hereinafter be more particularly pointed out and, for a more complete understanding of the characteristic features of this invention, reference may now be had to the following description when taken together with the accompanying drawings, in which latter:

Fig. 2 is a fragmentary portion of the end of one of the ramps embodied as an element in the apparatus of Fig. 1;

Fig. 3 is an end elevational view of Fig. 2 showing a container in position thereon;

Fig. 4 is a view similar to Fig. 3 of a fragmentary portion of a modified form of ramp construction for use as an element in the apparatus of Fig. 1;

Fig. 5 is a view similar to Fig. 2 disclosing a portion of a ramp of a different material;

Fig. 6 is an end elevational view of the ramp of Fig. 5 showing the container in elevation disposed thereon;

Fig. 7 is a view similar to Fig. 4, the ramp being formed of a different material;

Fig. 8 is a plan view of a fragmentary portion of a dispensing apparatus embodying the features of this invention, the cabinet being shown in section and a portion of the coin-controlled means being broken way to show internal structure;

Fig. 9 is a front view of a fragmentary portion of the apparatus shown in Fig. 8 with a portion of the cabinet thereof in section and the coin-controlled means being broken away to show internal structure;

Fig. 10 is a side elevational view of a fragmentary portion of the apparatus shown in Fig. 8, a portion thereof being shown in section;

Fig. 11 is an end view of a cam for the coin-controlled mechanism of the apparatus shown in Fig. 8;

Fig. 11a is a side elevational view of Fig. 11;

Fig. 12 is a plan view of a fragmentary portion of a dispensing apparatus showing a modified form of dispensing means, the cabinet thereof being shown in section;

Fig. 13 is a side elevational view of a fragmentary portion of Fig. 12, partially in section;

Fig. 14 is an end elevational view of a portion of the dispensing means embodied as an element in Fig. 12; and Fig. 15 is a front elevational view of Fig. 14.

Figure 1:
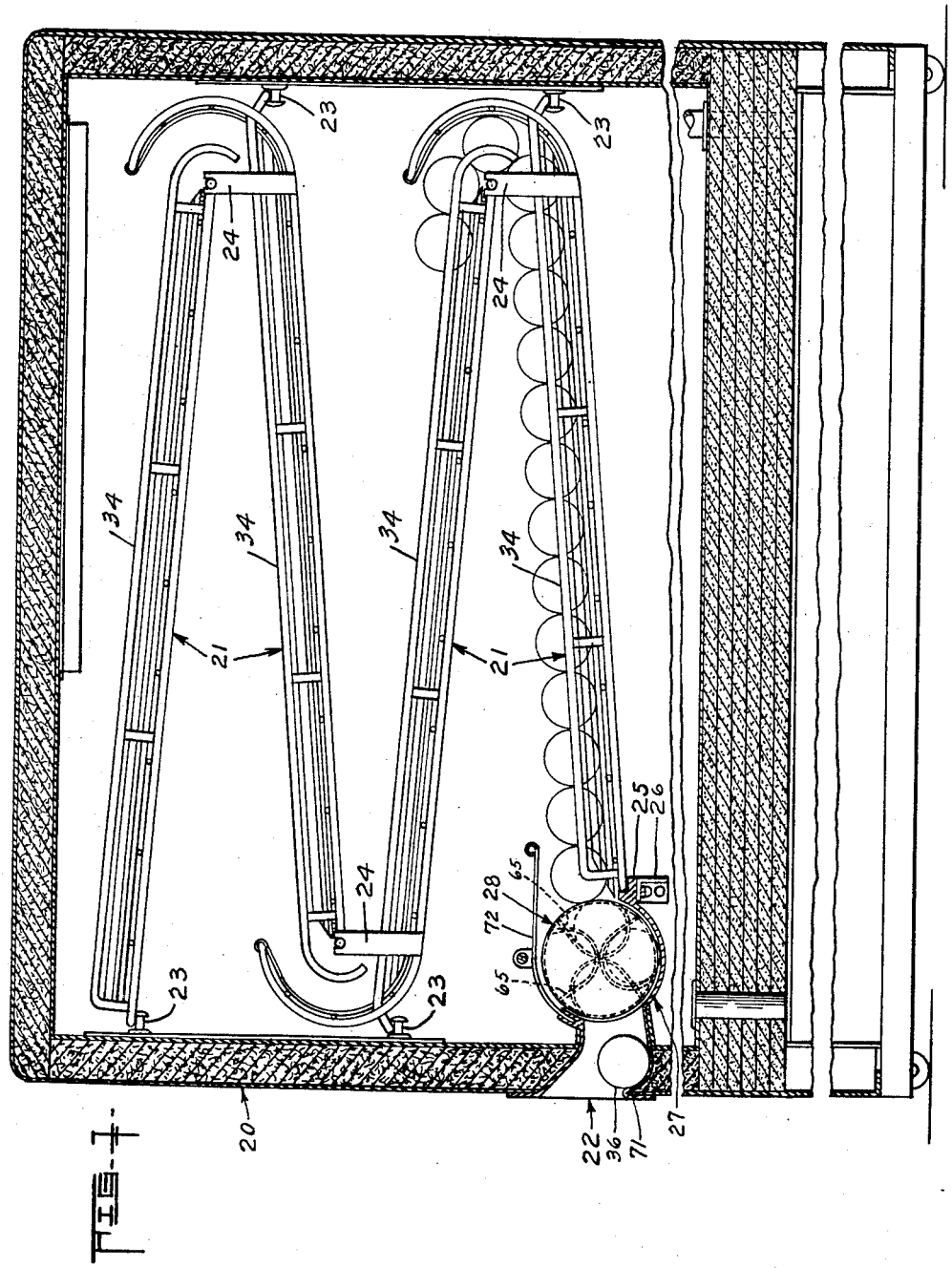
Figure 1 is a central vertical sectional view of a dispensing apparatus embodying the features of this invention, the cabinet being broken away to show the internal mechanism thereof in elevation.

Referring now more particularly to Fig. 1 of the drawings, the dispensing apparatus embodying the features of this invention is shown as comprising a cabinet 20 in the form of a substantially rectangular box enclosing a storage chamber for housing containers. The cabinet is formed of front, back and side walls and preferably a removable top. Each of the walls is formed of spaced sheets, the space between which is filled with insulation. Since the dispensing apparatus is designed primarily for storing and dispensing such liquids as milk, soft drinks, beer, and the like, which are contained in cylindrical containers and since it is desirable to keep these containers at a low temperature, suitable refrigerating apparatus (not shown) may be housed in the apparatus for cooling the storage chamber.

A plurality of inclined ramps 21 are disposed side by side and preferably in a superposed relation so that containers are capable of progressing by gravity over the inclined surfaces of the ramps from one ramp to the ramp next below, the last ramp communicating with the discharge opening 22. One end of each of the ramps detachably rests on pins 23 or other like supports extending from the inner walls of the cabinet, the other end of the ramp being detachably supported in cradles of arms 24 secured on the next adjacent ramp with the exception of the lowermost ramp which detachably rests on a cross bar 25 which is secured to angle iron members 26 fastened to opposed side walls of the cabinet. The cross bar 25 forms a part of a housing 27 for the dispensing means 28, the housing communicating with the discharge opening 22.

Referring now more particularly to Figs. 2 and 3 of the drawings, each of the ramps 21 comprises a plurality of spaced laterally and substantially horizontally extending supporting means in the form of strips of wire 29 for supporting a plurality of longitudinally extending members disposed thereon in a laterally spaced relation. The intermediate longitudinally extending members 30 and 31 are of non-uniform height or diameter and the other intermediate longitudinally extending member 32 of small diameter is, however, raised above the height of the members 30 and 31 by reason of the support thereof on a loop portion 33 of the laterally extending member 29. The end members 34 and 35 are raised a substantial distance above the plane of the intermediate members for guiding the container and preventing endwise displacement thereof from the rack, the member 34 being engaged by the bottom of the container as the container is tilted in position thereagainst.

The container 36 has a main body portion of substantially uniform cross section and an extending reduced neck having a head with a removable closure cap 37 thereon. The laterally and substantially horizontally extending supporting members 29 support the intermediate longitudinally extending members 30 and 31 and since the latter members are of non-uniform diameter and rest against the main body portion of substantially uniform cross section of the container 36, the container is tilted from a horizontal position in the direction of the end member 34. The tilting of the container 36 to rest against the end member 34 of the ramp prevents contacting engagement of the removable closure cap against the end support 35 and since it is not desired that the removable closure cap strike against any stationary object, the intermediate longitudinally extending member 32 preferably resists any tendency for the container to tilt in the direction opposite to its normal position.

Referring now more particularly to Fig. 4 of the drawings, the end member 35a, corresponding to the end member 35 of the previously described modification, is not normally contacted by the closure cap end of the container 36a and, when desired, the loop 33a may support the intermediate longitudinally extending wire 32a in a position adjacent the closure cap 37a rather than, as shown in the previous modification, adjacent the reduced neck of the container. The longitudinally extending member 32a prevents the accidental tilting of the container from its normally tilted position.

Referring now more particularly to Figs. 5 and 6 of the drawings, the ramp shown therein comprises laterally and substantially horizontally extending supporting means 38 formed of square wire for supporting a plurality of longitudinally extending members in a laterally spaced relation. The intermediate members 39 and 40 are preferably formed of strips of sheet metal bent into L-shape, the base of the strips being soldered, welded, or otherwise secured to the laterally extending supporting wires and the angularly extending portions being of non-uniform height, that is, the angularly extending portion of the strip 39 being of less height than the corresponding portion of the strip 40. The other intermediate strip 41 is similarly formed of a strip of sheet metal bent into L-shape with the base portion thereof soldered, welded, or otherwise secured to the laterally extending supporting means 38 and the angularly extending portion being of a substantially greater height than the corresponding portions of the strips 39 and 40.

The container 42 is of the type having a body portion of a substantially uniform cross section and an extending reduced neck 43 with a removable closure cap 44 on the head thereof. Such a container as in the previously described embodiment is ordinarily employed for holding milk and the closure cap is ordinarily formed of cardboard or heavy paper. The intermediate strips 39 and 40 are so disposed as to engage the main body portion of substantially uniform cross section and since the angularly extending portions of the intermediate members 39 and 40 are of non-uniform height the container is tilted from the plane of the horizontally extending supporting means. The intermediate member 41 is disposed adjacent the neck portion 43 of the container although preferably not in contact therewith during the normal travel of the container along the intermediate strips 39 and 40. However, the member 41 is so positioned that it prevents the accidental tilting of the container in the direction opposite to the normal position of tilt thereof.

Longitudinally extending end strips 45 and 46 are also supported by the laterally extending supporting means 38, the strips 45 and 46 each comprising a strip of sheet metal bent into inverted substantially U-shaped cross section having angularly extending feet which are welded, soldered, or otherwise secured to the supporting means. The bottom of the container 42 engages a portion of the strip 45 in line contact therewith to prevent endwise displacement of the container 42 from the strips 39 and 40. The strip 46 does not normally contact the closure cap 44, there being clearance therebetween, but acts to prevent accidental endwise displacement of the container from the strips 39 and 40 in the other direction.

The embodiment of the invention shown in Fig. 7 is similar in all respects to that shown in Figs. 5 and 6 with the exception that the strip 41a of L-shaped cross section is disposed adjacent the end strip 46a and the closure cap 44a instead of, as in the previously described embodiment, adjacent the reduced neck portion. The intermediate strip 41a has the same function as the strip 41 in the previously described embodiment in preventing the tilting of the container from its normally tilted position in the opposite direction except that such engagement as may be accidentally had is directed against the closure cap instead of against the reduced neck of the container.

Referring now more particularly to Figs. 1 and 8 to 11, inclusive, of the drawings, the dispensing means 28 is shown as being rotatably supported on stud shafts 47 and 48, the stud shafts fixedly engaging and extending outwardly from bearings 49 and 50 and being rotatably journalled in bearings 51 and 52, respectively, secured within the end walls of the closure means. The shaft 47 extends through and beyond the bearing 51 and has fixedly mounted on the extending end thereof a bevel gear 53 which engages with a bevel gear 54 fixedly mounted on a shaft 55. The shaft 55 is rotatably mounted on and between bearings 56 extending from the frame of a coin-controlled means 57, the coin-controlled means preferably having an electrically operated motor 58, the rotor shaft 59 of which has a channelled disc 60 fixedly mounted thereon. The intermediate circular portion of the channelled disc 60 is provided with an arcuate cut-away portion 61 adjacent which a pin 62 is disposed to extend between and be supported by the enlarged spaced portions of the disc. The star wheel 63 is fixedly mounted on the shaft 55, the slots of the star wheel receiving the pin 62 for delivering a quarter rotation of the shaft 55 upon a complete revolution of the rotor shaft 59 and the channel-shaped disc 60.

The motor 58 is energized to impart a complete revolution to the rotor shaft 59 thereof to rotate the channelled disc 60 a complete revolution so that a quarter revolution is imparted to the star wheel 63 which, in turn, imparts a quarter revolution to the shaft 47 through the bevel gears 53 and 54. A quarter revolution is thereby imparted to the dispensing means 28 upon the deposit of a coin in the coin-receiving housing 64. The coin-receiving housing 64 is, of course, of any usual type and a complete description thereof is believed, therefore, to be unnecessary. It is only necessary that the deposit of a coin therein energize a circuit through the motor to obtain a complete revolution of the rotor shaft thereof. It is also to be understood that a complete revolution of the rotor shaft may impart to the dispensing means any part of a revolution dependent upon the number of slots in the star wheel 63. This interrupted operation of the rotor is accomplished in the embodiment illustrated by means of a Geneva movement such as illustrated in Figs. 8, 9, and 10.

In the particular embodiment shown in the drawings the dispensing means 28 comprises a cylinder having a longitudinally extending pocket 65 for receiving a container, the pocket being disposed in the path of the containers of a ramp. A similar pocket 65 is disposed substantially diametrically oppositely and in alignment with the path of travel of the containers so that a container is dispensed from the pockets by every alternate revolution of the motor 58. Similar pockets are formed in the dispensing means 28 in alignment with the ramp disposed alongside of the first mentioned ramp, the pockets being staggered and substantially diametrically opposed so that a container is dispensed alternately from each ramp upon every single revolution of the motor 58. From the above it will be apparent that on a revolution of the rotor shaft 59 a quarter revolution of the shaft 47 will dispense a container from one of the pockets, the container being received from one ramp, and the following revolution of the rotor shaft will dispense a container from the other of the ramps.

In order for it to be assured that a container be delivered upon the deposit of each coin in the coin-controlled mechanism and that a return of the coin be made after the last container has been discharged from the cabinet, a shaft 66 is rotatably supported in one wall of the cabinet 20 and extends therethrough beyond each side thereof. A cam 67 is fixedly secured to one free end of the rotatable shaft 66 for engaging a lever 68 extending from a switch. An arm 69 preferably formed integrally with the shaft 66 extends angularly therefrom and has an arcuate container-engaging portion 70 for normally resting on the containers of the ramps. In a normal condition of operation the containers support the arm 69 in one position to maintain the switch operated by the lever 68 in a closed position so that upon the deposit of a coin in the coin box 64 the circuit through the motor 58 will be energized to operate the rotor shaft 59 to rotate, in turn, the dispensing means a quarter of a revolution to discharge a container through the discharge opening of the cabinet. The arm 69, however, is automatically operable into a second position by gravity when the last container has been discharged from the cabinet, the arm 69 dropping and rotating the shaft 66 to rotate, in turn, the cam 67 for the operation of the lever 68 to actuate the switch into an open position. The deposit of a coin in a coin box 64 thereafter will not effect an operation of the dispensing means but the coin will be returned to the prospective customer.

In the operation of the mechanism just described, the containers are fed by gravity action along the inclines of the ramps 21 to a position adjacent the dispensing means 28. As shown in Fig. 1, a container is directed to one of the pockets 65 of one ramp as the pocket comes into alignment therewith and upon the deposit of a coin, a quarter revolution of the dispensing cylinder discharges a container from one of the pockets to the discharge opening, the pocket being inclined to permit the container to roll by gravity therefrom onto an inclined surface of the discharge opening 22. The container is brought to rest on the forward end of the discharge opening against an upwardly extending lip 71.

Should the weight of the containers behind that container entering the pocket of the dispensing means be so great as to tend to stack the containers on top of each other, it may be necessary to provide a substantially rigid means 72 above the container to extend forwardly over a portion of the ramp in a spaced relation therewith to permit passage of the container in the space therebetween but to prevent stacking of the containers. One container is delivered from one of the ramps while a container from the other ramp is in position to be delivered upon the next operation, the pockets being staggered in a lateral direction.

Referring now more particularly to Figs. 12 to 15, inclusive, of the drawings, a modified form of dispensing means is shown comprising a pair of cylinders 73 fixedly mounted on a shaft 74 supported in bearings 75 on the side walls of the cabinet. The shaft 74 extends through the cabinet for operation by a coin-controlled mechanism 76 in the manner previously described with reference to the preceding embodiment. In the instance of the present dispensing means, the cylinder 73 is disposed in such a position on the shaft 74 that a peripheral portion thereof extends between intermediate members of the ramp.

A pair of arcuate cut-away portions or depressions 77 are provided on the periphery of each of the cylinders 73 in diametrically opposed relation, the recesses being inclined as shown more particularly in Fig. 15 in the same direction as the inclination of the intermediate longitudinally extending members of the ramp to form pockets for receiving the containers in their normally tilted position. The pockets 77 are staggered in a lateral direction so that a quarter revolution of the shaft 74 will dispense a container from one ramp and the succeeding quarter revolution of the shaft 74 will dispense a container from the other ramp.

Whereas the container is substantially entirely housed within the pocket of the dispensing means in the previous embodiment, the present container merely rests in notches forming pockets on the periphery of the dispensing means so that a major portion of the container is exposed. In this connection it is desirable, therefore, to provide a gravity-weighted door 78 for enclosing the discharge opening so as to prevent dissipation of the cooling medium from the cabinet to a maximum degree. Also to prevent access to the containers within the cabinet through the door 78, an angularly extending member 79 is secured to the door 78 to block the entrance to the interior of the cabinet when the door 78 has opened to dispense a container therethrough. Rigid means 80 are mounted above the ramp in a spaced relation therewith to permit containers to pass in the space therebetween but to prevent buckling or stacking of the containers due to pressure of the containers behind.

Claims directed to the ramp structure have been divided from this application and now appear in application Serial No. 471,430 filed January 6, 1943.

While several embodiments of this invention are herein shown and described, it is to be understood that various modifications thereof may be apparent to those skilled in the art without departing from the spirit and scope of this invention and, therefore, the same is only to be limited by the scope of the prior art and the appended claims.

We claim:

1. In an apparatus for cooling and dispensing containers, a cabinet containing a storage chamber having a discharge opening, an inclined ramp for supporting and for advancing said containers by gravity to said discharge opening, a dispensing closure for said discharge opening, an intermittently operable motor for operating said dispensing closure to deliver said containers one at a time, and a gravity-weighted member normally supported in one position by said containers for controlling the normal operation of said motor and automatically operable into a second position when the last container has been discharged through said discharge opening to render said motor inoperative for discharging containers.

2. In an apparatus for cooling and dispensing containers, a cabinet containing a storage chamber having a discharge opening, an inclined ramp for supporting and for advancing said containers by gravity to said discharge opening, a dispensing closure for said discharge opening, an electrically operated motor for operating said dispensing closure to deliver said containers one at a time, a motor switch, a pivotally mounted arm on said cabinet, a cam on said arm for operating said switch, said arm being normally supported in one position by said containers for maintaining said switch in a closed position to control the normal operation of said coin-controlled means, said arm being automatically operable into a second position when the last container has been discharged through said discharge opening for operating said switch into open position.

3. In an apparatus for cooling and dispensing containers, a cabinet containing a storage chamber having a discharge opening, an inclined ramp for supporting and for advancing said containers by gravity to said discharge opening, a dispensing closure for said discharge opening, a motor for operating said dispensing closure to deliver said containers one at a time, a switch for controlling said motor, a shaft rotatably supported in said cabinet, a cam fixed to and rotatable with said shaft for engagement with and control of said switch, and an arm on said shaft and extending over said containers and being normally supported in one position by said containers for controlling the normal operation of said switch, said arm being automatically operable by gravity into a second position when the last container has been discharged through said discharge opening to render said motor inoperative.

4. In a dispensing apparatus, the combination with a storage chamber having a plurality of side-by-side ramps for advancing articles by gravity toward a discharge opening, and a transversely extending rotor in the path of said articles, said rotor having one or more pockets in alignment with each ramp to receive consecutive articles by gravity from the respective ramp and discharge said articles consecutively by movement of said rotor, said pockets for the various ramps being radially offset in said rotor so that consecutive articles are discharged from different ramps, of a motor for driving said rotor, and a Geneva movement transmission between said motor and said rotor so that said rotor is only partially rotated with each revolution of the driving member of said Geneva movement and an article is discharged from only one pocket and from a different ramp with each partial revolution of said driving member.

5. In a dispensing apparatus, the combination with a storage chamber having a plurality of side-by-side ramps for advancing articles by gravity toward a discharge opening, and a transversely extending rotor in the path of said articles, said rotor having one or more pockets in alignment with each ramp to receive consecutive articles by gravity from the respective ramps and discharge said articles consecutively by intermittent movement of said rotor, said pockets for the various ramps being radially offset in said rotor so that consecutive articles are discharged from different ramps, of a motor for driving said rotor, a Geneva movement transmission comprising a driving member and a driven member between said motor and said rotor so that said rotor is only partially rotated with each revolution of the driving member of said Geneva movement and an article is discharged from only one pocket and from a different ramp with each partial revolution of said driving member, means for controlling said motor to predetermine the operation of said driving member, and means to make said last means ineffective to cause operation of said driving member when the number of articles in said chamber is below a predetermined minimum.

HERSCHEL V. GIBSON.
ELMER E. CASEY.